FIG-1

INVENTORS
RALPH R. ROESKY
JOHN W. HOPKINS
LARRY L. GENTRY
BY George C. Sullivan, Agent
Clay Holland, Jr.
Attorney

FIG.-2

INVENTORS
RALPH R. ROESKY
JOHN W. HOPKINS
LARRY L. GENTRY 3,482,410
UNDERWATER FLOWLINE INSTALLATION
Ralph R. Roesky, Los Altos, Larry L. Gentry, San Jose, and John W. Hopkins, Saratoga, Calif., assignors to Lockheed Aircraft Corporation, Burbank, Calif.
Filed July 1, 1968, Ser. No. 741,499
Int. Cl. E21b 33/035, 43/01; B63c 11/34
U.S. Cl. 61—72.3                        14 Claims

ABSTRACT OF THE DISCLOSURE

System for remotely installing underwater flowline between two or more underwater installations and between underwater installations and a surface station, the system incorporating the use of a buoyant capsule communicating a drawline between the underwater installations and the surface station, a flowline pulling tool and a flowline retrieval package. The system may further provide an atmospheric environment at said underwater installations so that personnel may perform operations inside the underwater installations.

BACKGROUND OF THE INVENTION

The present invention relates to underwater equipment, such as oil well equipment, for use at underwater locations and pertains more particularly to a method and apparatus for remotely coupling a flowline or conduit to an installation submerged within a body of water. The equipment includes both the coupling mechanism to establish communication between the installation and the conduit and the coupling-facilitating apparatus to be used in combination with the coupling mechanism.

For many years offshore wells have been drilled either from stationary platforms anchored to the ocean floor, movable barges temporarily positioned on the ocean floor, or movable barges floating on a body of water in which drilling operations are being conducted. Regardless of the manner in which the wells are drilled, most wells have been completed in a manner such that the outermost tubular member of the well extends upwardly from the ocean floor to a point above the surface of the body of water where a wellhead assembly or Christmas tree is mounted for controlling the production of the well.

Wellheads extending above the surface of a body of water have the disadvantage that they constitute a hazard to navigation in the vicinity of the well. In addition, when such wellheads are positioned in salt water, such as found in the ocean, the structure extending above the water is subject to the corrosive action of salt water and air. Positioning the wellhead and/or casinghead above the surface of the body of water has the advantage, however, that the flow handling and controlling components of the wellhead may be readily secured thereto and adjusted by an operator working from a platform adjacent to the wellhead structure.

Recently, methods and apparatus have been developed for drilling and completing oil and gas wells in the ocean floor in a manner such that after completion of the well the wellhead assembly is positioned beneath the surface of the ocean, preferably on the floor thereof. In practice, these wellhead assemblies are often positioned in depths of water greater than the depth at which a diver can safely and readily work. Thus, the coupling of flow conduits to such wellhead assemblies presents a new and difficult operation which is not readily carried out by presently available well-working equipment.

The problem of securing flowlines to installations submerged in very deep bodies of water is particularly acute because of the high ambient pressures involved, the difficulty of terminal alignment of the mating halves of the coupler and the difficulty of handling long lengths of pipe remotely. This problem is accompanied by the natural problems that are encountered when lowering flowlines to the bottom of relatively deep bodies of water. Long lengths of pipe are difficult to handle when submerged deeply in a body of water both because of the mass of pipe involved and the remoteness of the handling operation. It is noted that it is particularly difficult to lower long lengths of pipe directly into communication with a deeply submerged underwater installation because the exact length of pipe required to reach the installation is almost impossible, as a practical matter, to determine.

It is, accordingly, a principal object of this invention to provide a method and apparatus for remotely installing a flowline to an installation submerged in a deep body of water while overcoming the aforediscussed difficulties.

It is also an object of the invention to provide a method and apparatus for installing a flowline at an underwater installation without using an excess length of flowline, as required in certain prior art methods, and wherein the flowline is lowered into engagement with the installation from a surface location substantially directly over said installation.

It is a further object of the invention to provide an underwater flowline installation system which will eliminate the need for using divers to help make the flowline connection at the underwater installation.

A still further object of the invention is to provide said underwater installations with an atmospheric environment whereby personnel may work inside said installations and perform operations in connection with the flowline installation.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENTS

Figure 1:
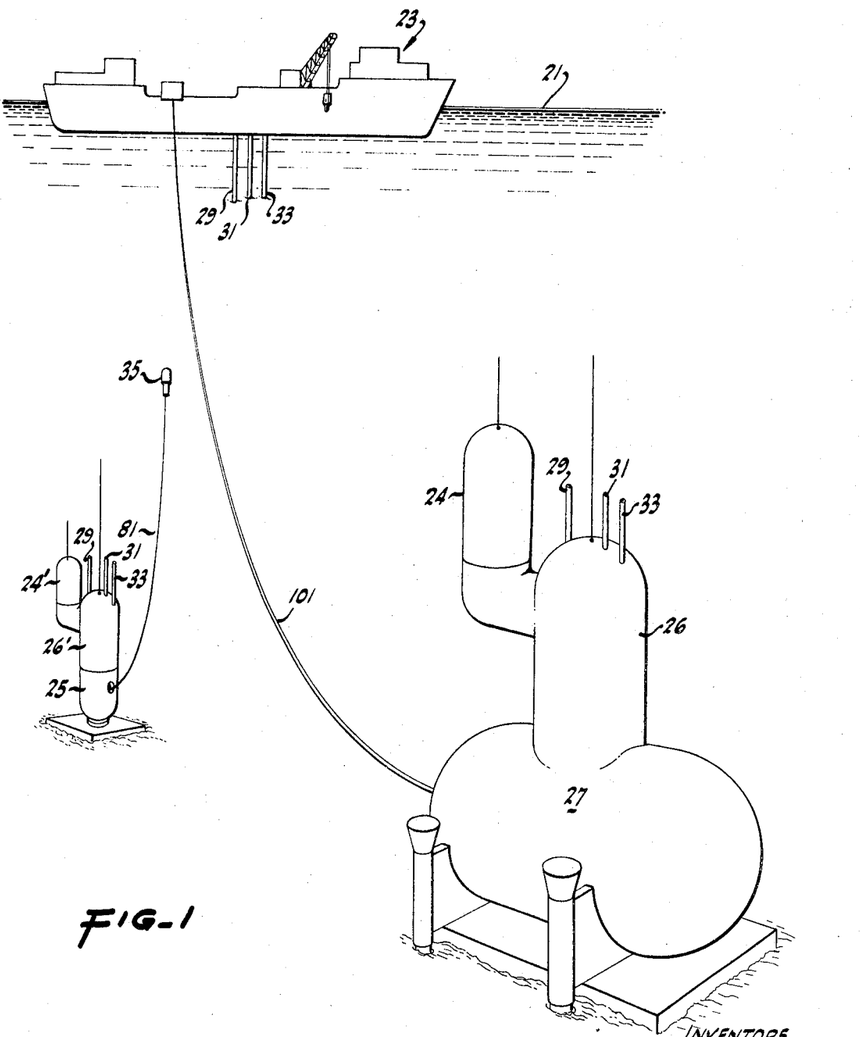
FIG. 1 is a diagrammatic view illustrating the manner in which a drawline connection may be made between one or more underwater installations and a surface station.
Figure 2:
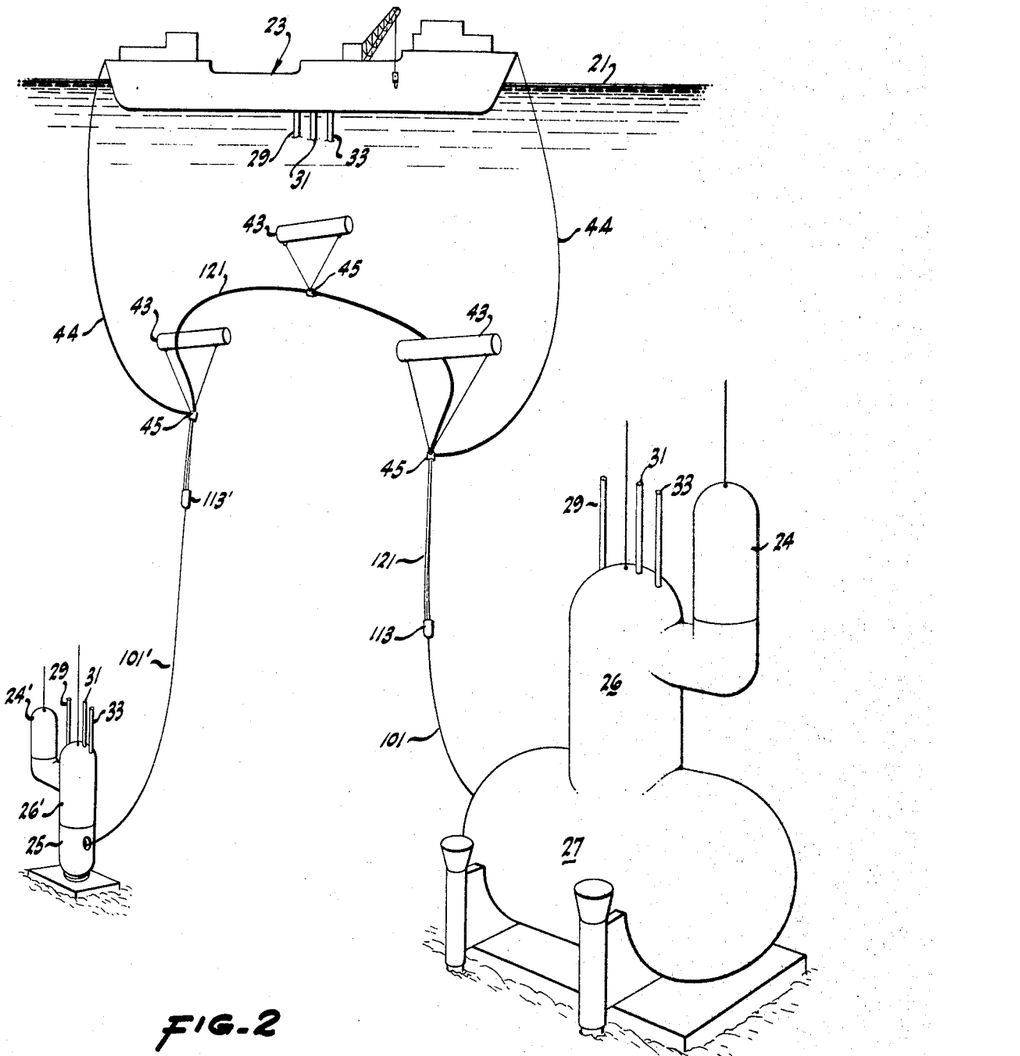
FIG. 2 is a diagrammatic view similar to FIG. 1 illustrating an exemplary manner in which a flowline connection may be made between two underwater installations.

Referring to FIGS. 1 and 2 of the drawing, there are illustrated exemplary applications of the invention in use in a body of water 21. In order to facilitate the application of the invention, an operating station taking the form of a floating barge 23 is illustrated as floating on the surface of the water 21 in a position approximately above a preselected underwater installation or underwater stations.

In FIGS. 1 and 2, two underwater stations 25 and 27 are shown. Underwater station 25 is shown as a wellhead cellar and underwater station 27 illustrates a manifold center or petroleum products gathering and separating station. The barge 23 is equipped with a supply of flowline which may be used to establish fluid communication between the underwater stations 25 and 27 or between either of the underwater stations and the floating barge itself. For example, a typical operation might include making a flowline connection between the wellhead cellar 25 and the manifold center 27 so that petroleum products may be recovered at the manifold center. The petroleum products fed to the manifold center may then be distributed to a gathering station (such as a platform or other structures not shown) on the water surface by means of another flowline connection between manifold center 27 and the surface station.

At this juncture it should be noted that the interiors of both underwater stations 25 and 27 are preferably at atmospheric conditions. This is necessary because in the preferred embodiment of the invention both stations should be capable of providing conditions under which a human operator or operators may remain inside the stations for long periods of time in order to perform various operations which will be described hereinafter.

Schematic air lines 29, conduits 31 for electrical conductors and conduits 33 for hydraulic connections are shown protruding from the top of an underwater capsule 26 and an associated personnel chamber 24 used to transport personnel to the manifold center 27. These connections 29, 31 and 33 all lead to the operating station 23 on the surface of the water to provide air and power connections to the underwater stations. Similar connections may be made with respect to the underwater station 25.

In order to facilitate an understanding of the entire invention, an overall operation will now be described with respect to FIGS. 1 and 2. The operation begins by releasing a buoyant plug 35 from one of the underwater stations such as the wellhead cellar 25. A lightweight line 81 (preferably a nylon line) is attached to the buoy and is payed out from the wellhead cellar as the buoy rises to the surface of the water 21 where it may be easily retrieved by personnel at the barge 23.

The line 81 is also attached at its trailing end to a cable 101 which is pulled to the surface 21 and then attached to the leading end of a flowline pulling tool 113 or 113'. The trailing end of the pulling tool is attached to a length of flowline which is to be lowered into the water from the barge 23.

The cable 101 shown in FIG. 1 leading from manifold center 27 to the barge 23 depicts that stage of the operation after the cable 101 has been connected to the flowline pulling tool 113 and just prior to beginning the operation of lowering flowline from the barge to either of the stations 25 or 27. The operators situated inside each of the underwater stations 25 and 27 now begin reeling in the lines 101 and 101' which are connected to the flowline pulling tools 113 and 113' which in turn are connected to the flowline 121 as best shown in FIG. 2.

FIG. 2 shows the flowline pulling tools 113 and 113' attached to a length of flowline 121 and wherein the flowline is being reeled in at both stations to make an underwater flowline connection between the underwater stations 25 and 27. The buoys 43 which are shown connected to the length of flowline 121 may be used to slow the descent of the flowline and prevent it from kinking and fouling or being otherwise damaged were it to be allowed to freely drop to the ocean floor. Safety lines 44 may be secured to the flowline 121 for additional descent control.

The buoys 43 may be released after the flowline pulling tools 113, 113' have been pulled into position at the underwater stations. The operation of releasing the buoys or any other types of descent control apparatus from the flowline may be performed by means of explosive bolts 45 which are interconnected by suitable electrical means not shown in FIGURE 2, for purposes of brevity. The electrical connection for performing this operation is made inside the underwater stations 25 and/or 27. However, it is sometimes desirable to leave the buoys attached to the flowline in order to facilitate the replacement of a length of flowline which may become corroded or otherwise damaged after a period of time on the ocean floor.

It should also be understood that it is not always necessary to use the buoys and also that other devices might be used to slow the rate of descent of the flowline. For example, a suitable winch with a releasable tension line might be operated from the barge 23 to facilitate the operation shown in FIG. 2.

The structural details of the devices and mechanisms used in accomplishing the above mentioned operations will now be described. These devices and mechanisms will be described with reference to the underwater manifold center 27, but it should be understood that these structural features are also equally applicable to the underwater well-head cellar 25.

Figures 3, 4, 9:
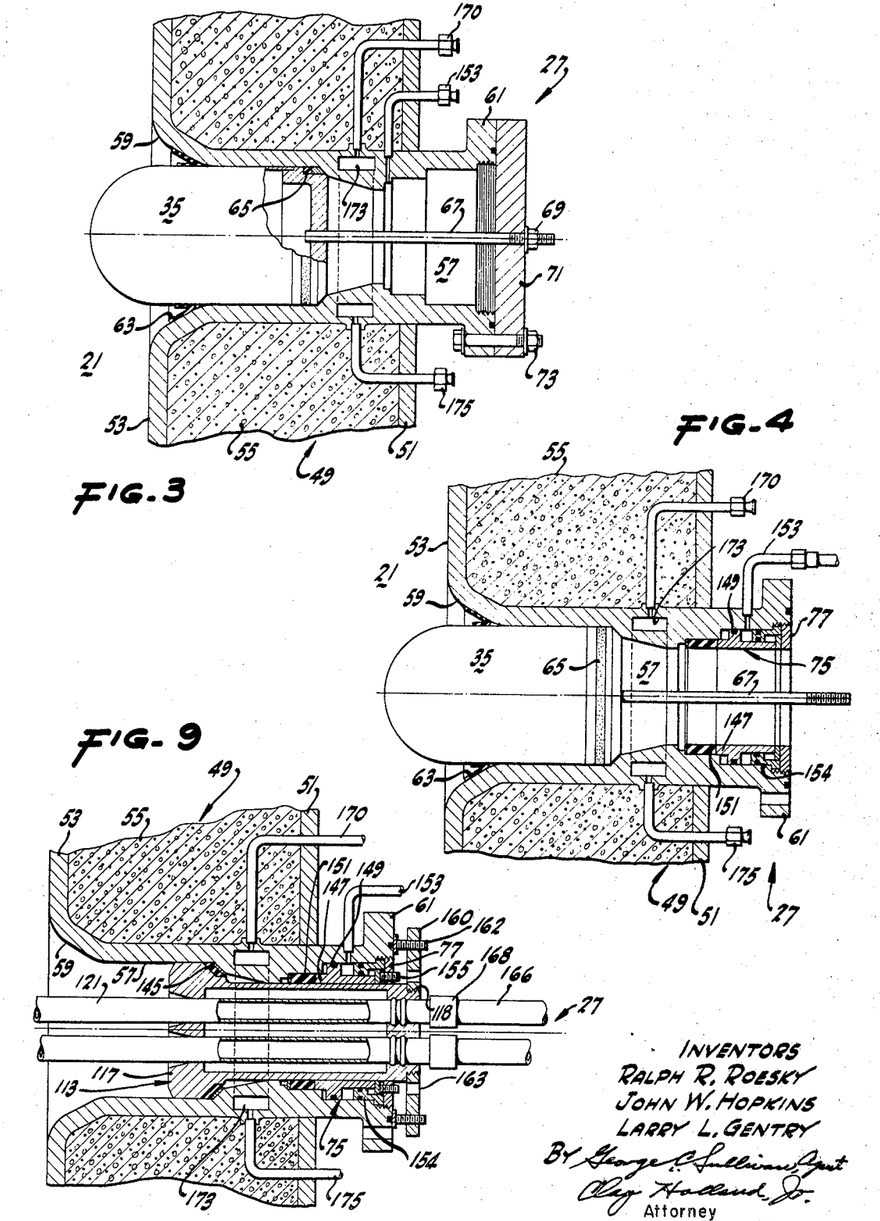
FIG. 3 is a sectional view through the wall of an underwater installation and illustrating a buoyant capsule or plug which acts as a watertight plug prior to ejection from the underwater installation.
FIG. 4 is a sectional view similar to FIG. 3 illustrating further details of the underwater installation.
FIG. 9 is a sectional view illustrating a completed fluid tight flowline connection and further illustrating production lines coupled to the flowlines at a location inside the underwater installation.

As shown in FIG. 3, the exterior housing of the underwater station 27 may be a double wall construction as illustrated, but this is not intended as a limitation of the invention. Thus, the housing 49 comprises an inner shell or wall 51 and an outer shell or wall 53 with concrete fill material 55 occupying the space between the walls. One or more access ports 57 are formed in the housing 49 to provide a means for installing flowline equipment to and from the interior of the manifold center 27.

The access port 57 is provided with a flared guide mouth 59 to permit easy and aligned entry into the interior of the access port. The interior portion of the access opening 57 is provided with a flanged lip or extension 61 to facilitate the attachment of various implements thereto.

In FIG. 3, the buoyant capsule 35 is shown positioned inside the access opening 57. A temporary seal 63 formed around the outer shell of the buoy 35 and in contact with the flared mouth 59 of the access port provides a first means for preventing water from leaking inside the interior of the access port 57. A second annular seal means 65 is formed around the exterior of the rear portion of the buoy 35 and further prevents water from entering the access port 57. It should also be recognized that the water pressure outside the underwater station tends to force the buoyant capsule inside the access port 57.

A rod member 67 extends from the rear wall of the buoy 35. The trailing end of the rod 67 is threaded and a nut 69 locks the rod in position with respect to a blind flange member 71 which is connected to the lip 61 of the access port 57 by a plurality of bolt members 73. Thus, it may be seen that the access port 57 is sealed off from communication with the interior of the manifold center 27.

Figure 5:
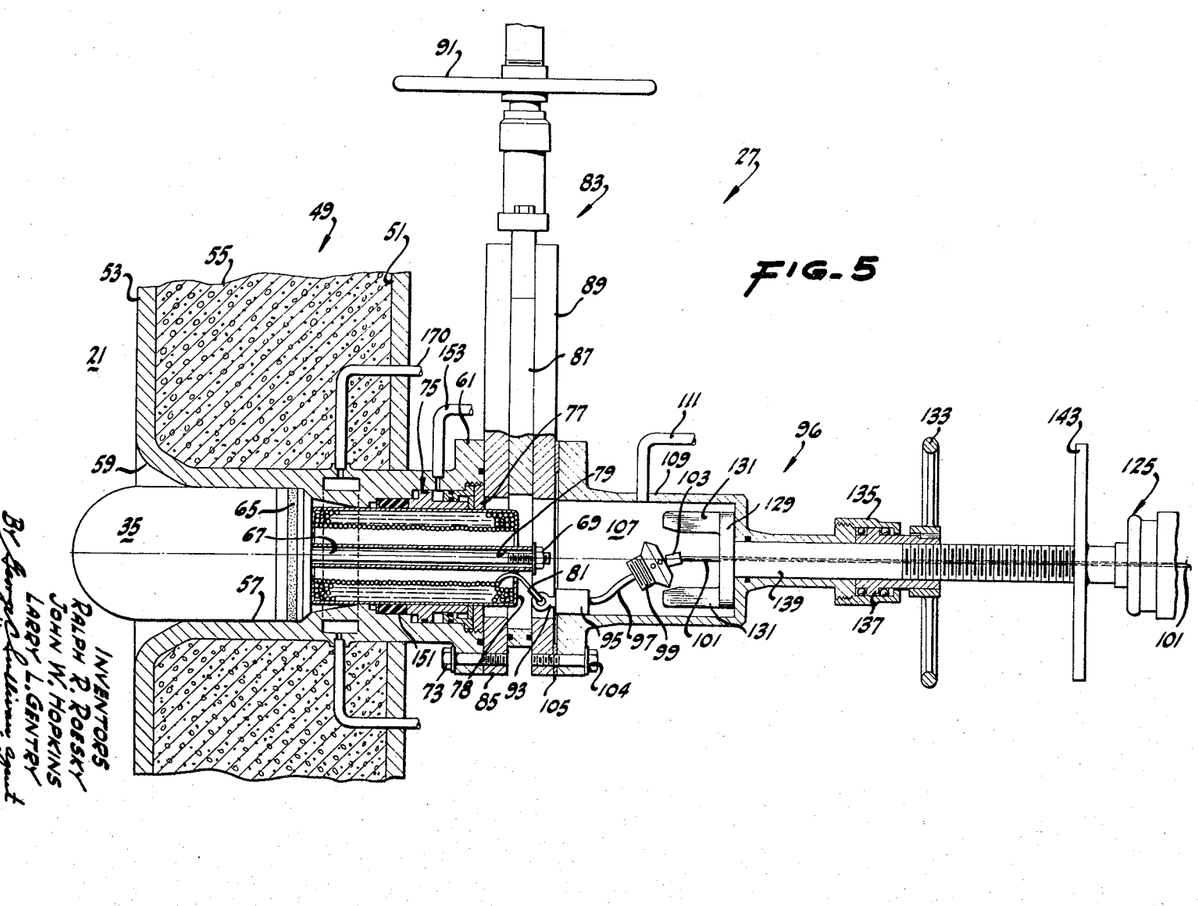
FIG. 5 is a sectional view illustrating means for ejecting the capsule and further illustrating a flowline retrieval package which has been fastened to the inner side of an access port formed in the wall of the underwater installation.

FIGS. 3, 4 and 5 depict the operations which are necessary in order to eject the buoy 35 from the underwater station 27 so that it may be retrieved at the surface station barge 23. The first step in this operation is the removal of the blind flange element 71 from the rear lip portion 61 of the access opening 57. This operation is accomplished by removing the nut 69 which is threaded onto the outer portion of the rod 67 and also removing the bolt assemblies 73 which attach the blind flange 71 to the lip flange 61.

As shown in FIG. 4, a sealing package generally denoted at 75 is then insertetd into the rear portion of the access port 57 and held therein by means of a locking ring 77 which is threadably received in the outer portion of the access port 57.

Referring now to FIG. 5, a hollow canister 78 having a relatively small central bore 79 is slipped over the rod element 67 of the buoy 35 and is securely held to the buoy 35 by means of the nut 69 which is threadedly fastened on the rod 67. The hollow canister 78 contains a spool of loosely wound nylon line the end of which extends from the rear of the canister as shown at 81.

A gate valve assembly generally shown at 83 is then securely bolted to the lip flange 61 by bolt elements 73 which extend through the lip flange and the front piece 85 of the gate valve assembly. The gate valve assembly 83 is provided with a vertically movable gate element 87 which is closely received between the front piece 85 and a back piece 89 of the gate valve. Vertical movement may be imparted to the movable gate 87 by an operator rotating a hand wheel 91.

It is noted at this point that the gate valve assembly 83 is shown for illustrative purposes and is not intended as a limitation of the invention. More particularly, the gate valve assembly may be replaced by any suitable shut-off device which is capable of providing ingress and egress to access opening 57, such as a ball valve for example.

After the gate valve assembly 83 has been secured to the lip flange 61, the protruding end of the nylon line 81 is securely fastened to an eye bolt 93 which eye bolt is part of a cable socket element 95. The cable socket assembly 95 is part of an overall flowline retrieval package which is generally denoted at 96 and which will be connectetd to the gate valve 83 at a later point in the operation. A short length of cable 101, designated as 97, extends from the rear of the cable socket 95 and passes through the retainer plug 99. The retainer plug 99 is restricted in its movement along cable 101 between cable socket 95 and a cable clamp 103. The cable 101 extends longitudinally throughout the entire length of the flowline retrieval package 96 where it is connected to a conventional tension reel mechanism (not shown). This mechanism may be located in either the manifold center 27 or in the personnel capsule 26.

After the nylon line 81 has been attached to the cable socket 95 as described above, the entire flowline retrieval package 96 is attached to the back plate 89 of the gate valve assembly 83 by means of a plurality of bolt elements 104. A seal 105 is provided between the gate valve assembly 83 and the flowline retrieval package 96 to insure that the connection therebetween is fluid tight.

The buoy 35 is now in a condition where it may be expelled from the access port 57 of the underwater station 27 so that it may float to the surface where it may be retrieved at the barge 23. The buoy 35 is expelled by admitting air or hydraulic pressure into a chamber 107 formed in the housing 109 of the flowline retrieval package 96. Pressure is admitted into the chamber 107 through means of a suitable port 111 formed in the housing 109. The source of pressure is not shown; but it is to be understood that any air tank at the station 27, or for that matter, pressure from the surface station 23 could be used for this purpose. In any event, pressure in the chamber 107 is increased until it is great enough to overcome the water pressure on the outside of the underwater station 27.

After the buoy 35 is blown out of the underwater station 27, it rises to the water surface 21 paying out the nylon line 81. At the water surface, the buoy 35 is retrieved by personnel on the barge 23 and the nylon line is detached from the cable socket 95. This stage of the operation is similar to the condition shown in FIG. 1 wherein a wire cable 101 is shown extending from the underwater station 27 to the surface station or barge 23.

Personnel on the barge 23 attach the threaded retainer plug 99 into the nose portion of a flowline pulling tool.

The flowline pulling tool 113 is comprised of a rear portion 117 which is removably secured to a nose portion 115 by means of a threaded connection 118 and a plurality of anti-rotation nuts 119. The rear portion 117 of the flowline pulling tool is provided with one or more flowlines 121 which are securely fastened inside the element 117 by a welding, swaging or other suitable fastening operation.

Thus, prior to entering the underwater station 27, there is a condition in which the nose portion 115 of the flowline pulling tool has been attached to the lead end of the wire line cable 101 and the rear portion 117 of the tool 113 has been connected to a desired number of flowlines 121.

At this stage of the operation personnel at the underwater station 27 begin reeling in the wire line cable 101. As the flowline pulling tool 113 submerges below the water surface, personnel on the barge 23 continually add additional lengths of flowline by means of coupling elements. In accordance with a second technique, the flowline may be of a relatively flexible type in which case it is merely reeled off the barge 23 as the wire line is reeled in at the underwater station 27. In yet another technique, the flowline is of a preselected length and prefabricated, press tested, and protective coated, having a flexible portion thereof which allows an extension or contraction of the preselected length. The flexible and extensible portion aids in the installation between two subsea locations which are in close proximity and little, if any, flexibility in the flowline would exist in the absence of a provision therefor. As previously mentioned releasable buoys 43 may be attached to the flowlines 121 in order to retard their rate of descent and prevent kinking and fouling of the flowlines.

As the operator at the underwater station 27 reels in the cable 101, the cable will pass through several conventional mechanisms which need only brief description for purposes of the present invention. These elements comprise a wire line stripper 125 which is provided with an emergency closing and sealing mechanism. There is also provided a conventional wire line control head 127 which is provided with suitable hydraulic packing and related elements.

Figure 6:
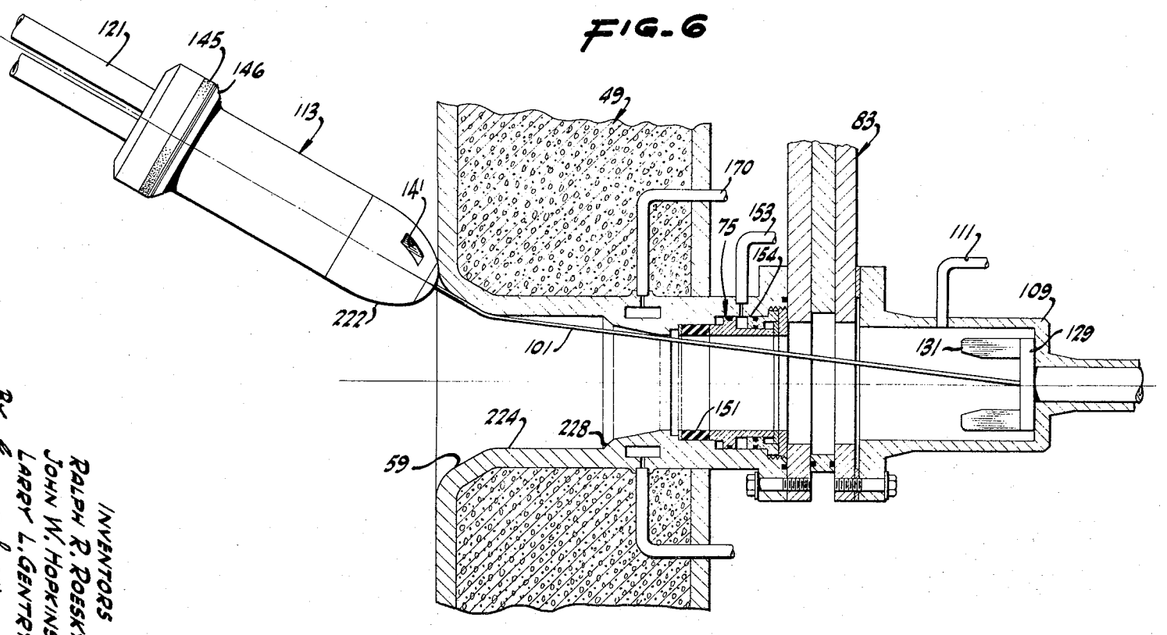
FIGS. 6 and 7 are sectional views illustrating a flowline pulling tool with attached flowlines being moved into position within the access port and illustrating the relationship of several of the critical surfaces of the pulling tool to surfaces of the access port.

As the flowline pulling tool 113 approaches the underwater station 27, the nose portion 115 will be easily guided into the access port 57 by means of the flared mouth 59 provided on the ocean side of the access port (see FIG. 6).

As shown in FIG. 6, the flowline pulling tool 113 is pulled down to the general vicinity of the access port 57. As contact with the underwater station 27 is made, the angle of misalignment may be 30° or more as depicted in FIG. 6.

The pull-down cable 101 is reeled in causing the pulling tool 113 to enter the large outer diameter of the access port 57. The forward contoured surface 222 of the pulling tool 113 and flared mouth 59 of the access port 57 aid in initial penetration of the pulling tool 113. The large disparity between the forward diameter 222 of the pulling tool 113 and the outer diameter 224 of the access port 57 precludes binding of the pulling tool 113 during this initial penetration.

Figure 7:
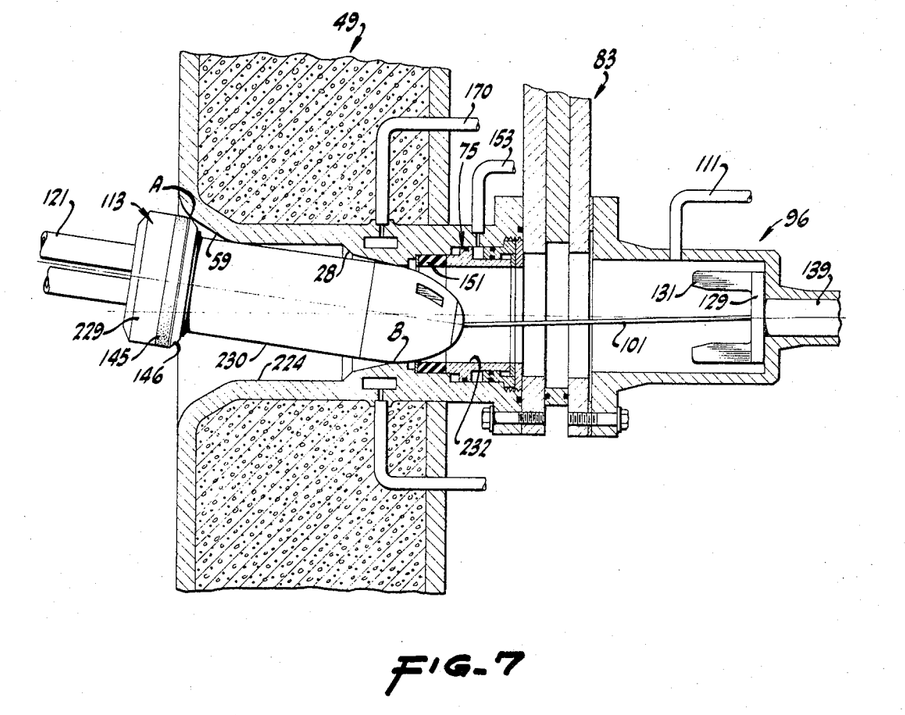

The pulling tool 113 is pulled into the access port 57 until an annular seal 145 adjacent backup ring 146 comes into contact with the flared mouth 59, as shown in FIG. 7. At this point a reaction force couple is generated at points A and B which causes the pulling tool 113 to align within the access port 57. The harder the pull on line 101 the greater the aligning forces at A and B.

Figure 8:
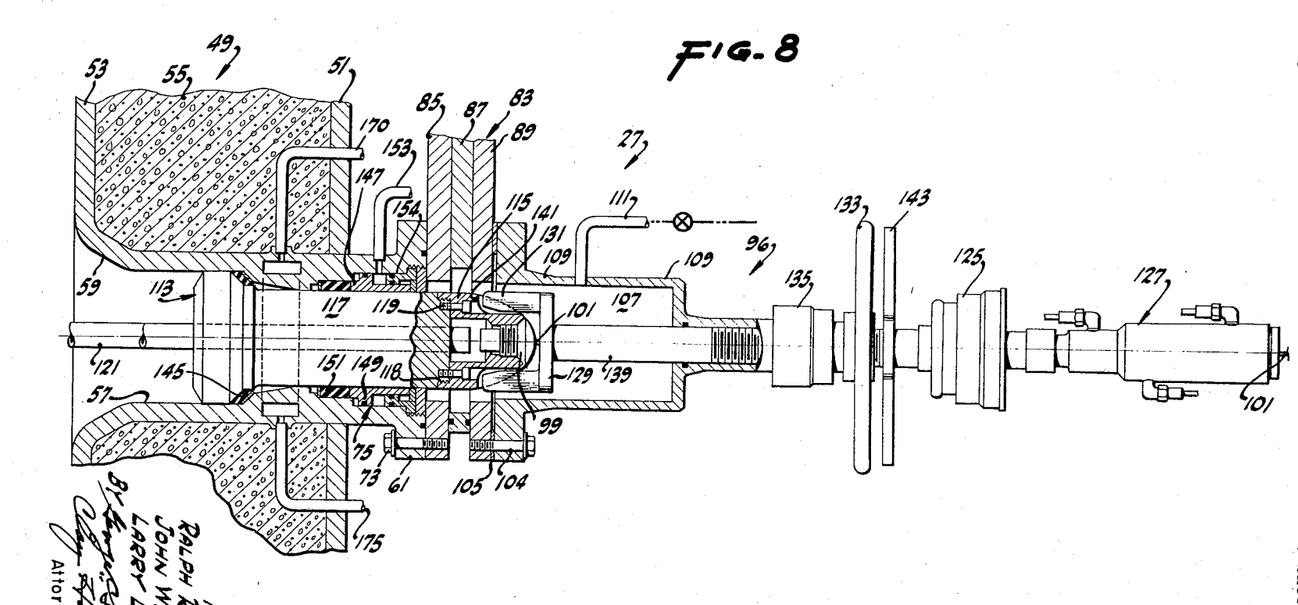
FIG. 8 is a sectional view similar to FIG. 7 illustrating a flowline pulling tool with attached flowlines moved into position within the access port of the underwater installation.

The pulling tool 113 then enters the final alignment position where the pulling tool seal 145 and backup ring 146 contact the internal port shoulder 228 as shown in FIG. 8. The two diameters 229 and 230 of the pulling tool are housed within the port diameters 224 and 232 respectively.

Referring now to FIG. 5 in conjunction with FIG. 8, an alignment spanner wrench 129 having a U-shaped fork element 131 is provided in the chamber 107 of the flowline retrieval package 96. The alignment wrench 129 may be moved lengthwise through the chamber 107 by means of a typical screw thread arrangement, for example, including a hand wheel 133, which is associated with a thrust bearing assembly 135. Rotation of the hand wheel 133 causes rotation of a threaded sleeve 137 mounted in bearing element 135. Rotation of the sleeve 137 results in longitudinal movement of a threaded rod 139 which is an extension of the alignment wrench 129. It should be noted that the foregoing arrangement is only one of many techniques available for moving wrench 129 back and fourth in the retrieval package 96.

The U-shaped end 131 of the alignment wrench is adapted to fit into slots 141 formed on the nose portion 115 of the flowline pulling tool 113 in order to securely hold and properly align the flowline pulling tool with respect to the flowline retrieval package 96 once the tool has been pulled into the position shown in FIG. 8.

Thus, as the cable 101 is reeled in and the flowable pulling tool 113 enters through the flared mouth 59 of the access port 57, personnel in the underwater station 27 rotate the hand wheel 133 to extend the alignment wrench 129 toward the tool 113. After contact has been made between the wrench 129 and the flowline pulling tool 113, an operator rotates an alignment arm 143 until U-shaped end 131 of the wrench 129 engages the slots 141 of the pulling tool nose portion 115. The alignment wrench and nose portion 115 are then moved snugly into engagement via the slot 141 so that the flowline pulling tool may be properly held in rotational alignment inside the flowline retrieval package 96.

At this juncture, it should be observed that any water which was admitted into the chamber 107 during the operation of pulling the flowline tool 113 into the access port 57 of the underwater station 27 may be bled off from the chamber 107 by means of the port 111. It should also be observed that the rear portion 117 of the flowline pulling tool 113 is provided with an annular packing seal 145 which cooperates with a shoulder element formed in the access port 57 to insure that the connection between the elements is fluid tight.

As noted in FIG. 8, the sealing package 75 comprises an inner movable sleeve member 147 which has an external annular shoulder element 149. The end portion of the inner sleeve 147 is provided with a relatively heavy, flexible pad seal 151 which is capable of expanding laterally upon the application of a suitable squeezing force. Thus, the sleeve element 147 carrying the pad seal 151 is closely received inside the access port 57.

After the flowline pulling tool 113 has been securely in the position shown in FIG. 8, suitable hydraulic pressure is admitted through a port 153. This pressure acts upon the raised shoulder 149 of the movable sleeve 147 and forces the sleeve 147 to move away from a fixed sleeve element 155 to thereby squeeze the pad seal into fluid tight engagement with the access port 57 and the tool 113. Thus, a double seal arrangement is provided by the two seals 145 and 151 to positively insure against the entry of sea water into the underwater station 27.

After the flowline pulling tool 113 has been securely sealed in place as described, the flowline retrieval package 96 may be removed so that personnel in the underwater station 27 may gain access to the flowlines 121. The flowline retrieval package is disconnected by removing the bolts 103 which connect the package to the back plate 89 of the gate valve assembly 83. Slack is now provided in the pull-in cable 101 so that the package 96 may be moved to the right in order to gain access to the retainer plug 99 which is threaded into the nose portion 115 of the flowline pulling tool 113.

The retainer plug 99 is then unscrewed from the nose portion 115 of the flowline pulling tool 113 and the entire package 96 is removed. The gate valve assembly 83 is then removed by releasing the bolt assemblies 73 which attach the gate valve to the lip flange 61 of the underwater station 27. The anti-rotation screws 119 which aid in securing the nose portion 115 to the rear portion 117 of the flowline pulling tool 113 are then removed. The nose portion is then unscrewed from the threaded connection 118 between nose and rear portions thereby exposing the leading ends of the flowlines 121 as shown in FIG. 9.

In FIG. 9 a first group of set screws 155 have been threaded into openings which are circumferentially spaced about the spanner nut or lock ring 77 which serves to hold the sealing package 75 in proper position. The first group of set screws 155 engage the rear portion of the inner sleeve 147. It should be observed that tightening of the set screws 155 will force the sleeve member 147 leftwardly which movement will squeeze the pad seal 151 into a very tight locked and sealed position with respect to the access port 57 and the flowline pulling tool 113. Thus the set screws 155 function as a mechanical lock to ensuer that the pad seal 151 is in fluid tight engagement with the access port 57 and the flowline pulling tool 113. At this point in the operation the hydraulic pressure admitted through line 153 may now be released since the set screws 155 will now hold the pad seal 151 in proper position.

A plate flange member 160 is now threaded into the rear portion 117 of the tool 113 using the same threads 118 which were previously utilized to secure the nose portion 115 to the rear portion 117 of the tool. A second group of set screws 162 are threaded through circumferentially spaced holes formed in the plate flange 160. It should also be observed that the plate flange 160 is provided with openings 163 which provide access to the first group of set screws 155 so that they may be tightened or loosened as desired. Tightening of the set screws 162 forces them into engagement with the lip flange 61 of the underwater station 27 and serves to pull the tool 113 tightly inside the access port 57. Movement of the tool 113 also squeezes the packing seal 145 into fluid tight engagement with the access port 57. These operations further ensure that both seal members 145 and 151 are firmly set so that there will not be any leakage into the underwater station 27 where the operators are working.

Personnel inside the underwater station 27 now proceed to interconnect production lines 166 (which lines may produce gas, oil and other petroleum products from the oil bearing strata beneath the ocean floor) to the flowlines 121. The connections between the production lines 166 and the flowlines 121 which extend through the flowline pulling tool 113 are made by conventional couplings 168 which are provided with both left and right hand threads. The operation has now been completed and petroleum products may now be flowed through the flowlines 121 into and out of the underwater station 27.

With reference to FIG. 9, after the passage of a considerable amount of time it could occur that the pad seal 151 will begin to fail thereby permitting sea water to leak into the underwater station 27. The personnel inside the underwater station will be able to observe this leakage and an emergency safety device has been provided should such leakage occur. For example, if the leakage occurs after the set screws 155 have been tightened as far as possible there is no effective way to stop the leakage without replacing the pad seal 151 with a new seal.

In order to replace the pad seal 151 liquid nitrogen is circulated through port 170 into an annular chamber 173 formed in housing shell 51 and returned to a liquid nitrogen pressure source through the port 175. As the extremely cold liquid nitrogen is recirculated through the annular chamber 173 the sea water entrapped between the outer packing seal 145 and the inner pad seal 151 will be frozen solid thus serving as a seal itself and preventing further leakage into the interior of the underwater station 27. Personnel inside the underwater station 27 keep circulating liquid nitrogen through the chamber 173 while the plate flange 160 and spanner nut 77 are removed. The sealing package 75 is then removed from the access port 57 and a new pad seal element 151 is provided on the end of inner sleeve 147. The seal assembly 75 is then replaced and the set screws 155 and 162 are again actuated to form a tight double seal arrangement and pumping of the liquid nitrogen into the chamber 73 is stopped.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A method of remotely connecting a flowline with an underwater installation submerged in a body of water, said method comprising:
   (a) establishing the underwater installation at or near the water floor;
   (b) connecting a first end of a flexible drawline to a buoyant capsule positioned in an access port of said underwater installation;
   (c) connecting a second end of said drawline to a source of tension located inside said underwater installation;
   (d) expelling the buoyant capsule from the access port of said underwater installation;
   (e) recovering said buoyant capsule at a surface station located on the surface of said body of water;
   (f) disconnecting said buoyant capsule from said drawline;
   (g) connecting the leading end of a flowline pulling tool to the first end of said drawline;
   (h) connecting the trailing end of said flowline pulling tool to a length of flowline located at said surface station;
   (i) actuating a tension reeling mechanism to pull the drawline, flowline pulling tool and the flowline downwardly through the water into the access port; and
   (j) establishing a fluid tight connection at the access port between said flowline and said underwater installation.

2. A method of remotely connecting a flowline with an underwater installation submerged in a body of water, said installation being provided with an atmospheric environment so that human personnel may perform operations inside said instalaltion, said method comprising:
   (a) establishing said underwater installation at or near the water floor;
   (b) connecting a first end of a flexible drawline to a buoyant capsule positioned in an access port of said underwater installation;
   (c) connecting a second end of said drawline to a source of tension located inside said underwater installation;
   (d) having personnel at said underwater installation actuate a mechanism to expel the buoyant capsule from the access port of said underwater installation;
   (e) recovering said buoyant capsule at a surface station located on the surface of said body of water;
   (f) disconnecting said buoyant capsule from said drawline;
   (g) connecting the leading end of a flowline pulling tool to the first end of said drawline;
   (h) connecting the trailing end of said flowline pulling tool to a length of flowline located at said surface station;
   (i) having personnel at said underwater installation actuate a tension reeling mechanism to pull the drawline, flowline pulling tool and the flowline downwardly through the water into the access port; and
   (j) establishing a fluid tight connection at the access port between said flowline and said underwater installation.

3. The method of claim 2 further comprising connecting releasable buoys to sections of said flowline as said flowline is lowered into the water from said surface station in order to control the rate of descent of said flowline sections down through said body of water.

4. A method of connecting a flowline between a first underwater installation and a second underwater installation, said method comprising:
   (a) establishing a first underwater installation at or near the water floor;
   (b) connecting a first end of a flexible drawline to a buoyant capsule positioned in an access port of said underwater installation;
   (c) connecting a second end of said drawline to a source of tension located inside said underwater installation;
   (d) expelling the buoyant capsule from the access port of said underwater installation;
   (e) recovering said buoyant capsule at a surface station located on the surface of said body of water;
   (f) disconnecting said buoyant capsule from said drawline;
   (g) connecting the leading end of a flowline pulling tool to the first end of said drawline;
   (h) connecting the trailing end of said flowline pulling tool to a length of flowline located at said surface station;
   (i) actuating a tension reeling mechanism to pull the drawline, flowline pulling tool and the flowline downwardly through the water into the access port;
   (j) establishing a fluid tight connection at the access port between said flowline and said first underwater installation; and
   (k) duplicating the operations set forth in paragraphs (a) through (j) above with respect to a second underwater installation so that a flowline connection is established on the ocean floor between said first and second underwater installations.

5. A method as set forth in claim 4 wherein both underwater installations are provided with an atmospheric environment so that human personnel may perform operations inside said installations.

6. The method of claim 4 wherein after a combined length of flowline approximately equal to the distance between said underwater stations has been attached to the drawlines associated with each of said first and second underwater installations said flowline lengths associated with each drawline are coupled to each other at said surface station and said flowline is released from the barge and allowed to descend to the ocean floor.

7. Apparatus for use at an underwater installation for installing a flowline at said installation, said apparatus comprising:
   (a) an access port at said installation having an external guide mouth for easily guiding objects into said access port;
   (b) flexible drawline means having a first end connected to a tension reel mechanism located inside said installation;
   (c) a second end of said drawline connected to the leading end of a flowline pulling tool;
   (d) at least one flowline connected to the trailing end of said pulling tool, (e) first annular seal means located on the outer surface of said pulling tool for engaging the walls of said access port to form a first fluid tight seal;

(f) second annular seal means located inside said access port and between said first seal means and the inside of said underwater installation; and (g) movable means associated with said second seal and operable from inside said installation for squeezing said second seal means into fluid tight engagement with the walls of said access port and the exterior surface of said flowline pulling tool.

8. Apparatus as set forth in claim 7 wherein removable means are provided for removing said second seal assembly from said access port to replace the second annular seal without distrurbing the position of said pulling tool and flowline with respect to said access port.

9. Apparatus as set forth in claim 7 and further including hydraulic means for actuating the movable means associated with said second seal assembly.

10. Apparatus as set forth in claim 7 and further including mechanical means for actuating the movable means associated with said second seal assembly.

11. Apparatus as set forth in claim 7 and further including both hydraulic and mechanical means for actuating the movable means associated with said second seal assembly.

12. Apparatus for use in connection with an underwater installation for installing a flowline at said installation, said apparatus comprising:

(a) an access port at said underwater installation for permitting entry and egress of movable objects into and out of said installation;

(b) first sealing means associated with said access port for maintaining the interior of said underwater installation substantially fluid tight while objects are being moved into or out of said underwater installation;

(c) a buoyant capsule adapted to be positioned in said access port;

(d) means for forcefully ejecting said capsule from said access port;

(e) a flexible drawline having a first end connected to said capsule and a second end secured to a source of tension inside said underwater installation so that after said capsule is ejected it may be recovered at the water surface and the drawline may be connected to a length of flowline which is pulled into said access port by means of said drawline tension means; and (f) second sealing means operatively associated with said access port for maintaining a fluid tight seal between said flowline and said access port after said flowline has been pulled inside said access port.

13. Apparatus as set forth in claim 12 wherein said bouyant capsule is ejected from said access port by means of a housing connected to an inner flange of the access port, said housing having a pressure chamber therein, and means for increasing the pressure in said chamber to overcome the water pressure outside and underwater installation and eject said capsule from said access port.

14. Apparatus as set forth in claim 12 and further including a flowline pulling tool having a first end adapted to be secured to said drawline and a second end adapted to receive said flowline in fluid tight relation; and means opratively associated with said access port for engaging the first end of said flowline pulling tool and operable to rotatably align said flowline pulling tool inside said access port.

References Cited

UNITED STATES PATENTS

| | | | |
|---|---|---|---|
| 3,211,223 | 9/1965 | Hoch | 166—.6 |
| 3,233,667 | 2/1966 | Van Winkle | 166—.6 |
| 3,308,881 | 3/1967 | Chan et al. | 166—.6 |
| 3,361,199 | 1/1968 | Haeber et al. | 166—.5 |

JACOB SHAPIRO, Primary Examiner

U.S. Cl. X.R.
61—69; 166—.5, .6